(12) United States Patent
Yoshimura

(10) Patent No.: US 10,717,250 B2
(45) Date of Patent: Jul. 21, 2020

(54) COMPOSITE MATERIAL FOR EMBOSSING, AND EMBOSSED PRODUCT

(71) Applicant: SEIREN Co., LTD., Fukui-shi, Fukui (JP)

(72) Inventor: Masaru Yoshimura, Fukui (JP)

(73) Assignee: Seiren Co., Ltd., Fukui (JP)

( * ) Notice: Subject to any disclaimer, the term of this patent is extended or adjusted under 35 U.S.C. 154(b) by 0 days.

(21) Appl. No.: 15/759,664

(22) PCT Filed: Sep. 23, 2016

(86) PCT No.: PCT/JP2016/004323
§ 371 (c)(1),
(2) Date: Mar. 13, 2018

(87) PCT Pub. No.: WO2017/056465
PCT Pub. Date: Apr. 6, 2017

(65) Prior Publication Data
US 2019/0039346 A1 Feb. 7, 2019

(30) Foreign Application Priority Data

Sep. 30, 2015 (JP) .................................. 2015-193866

(51) Int. Cl.
*B32B 5/24* (2006.01)
*B32B 5/18* (2006.01)
(Continued)

(52) U.S. Cl.
CPC .................. *B32B 5/18* (2013.01); *B32B 3/30* (2013.01); *B32B 5/024* (2013.01); *B32B 5/026* (2013.01);
(Continued)

(58) Field of Classification Search
CPC ........... B32B 5/14; B32B 5/142; B32B 5/145; B32B 5/18; B32B 3/26; B32B 3/263; B32B 3/30; B32B 27/06; B32B 27/065; B32B 27/40; B32B 2250/24; B32B 2266/0278; B32B 2307/51; B32B 2307/72;
(Continued)

(56) References Cited

U.S. PATENT DOCUMENTS 3,471,354 A * 10/1969 Scofield ................ B29C 59/046
425/370
3,477,898 A * 11/1969 Buff ........................ B32B 27/00
428/213
4,086,947 A * 5/1978 Payne ..................... B60C 11/02
152/175

FOREIGN PATENT DOCUMENTS

JP     2003-326598 A    11/2003
JP     2007-276285 A    10/2007
(Continued)

*Primary Examiner* — Megha M Gaitonde
(74) *Attorney, Agent, or Firm* — Norris McLaughlin, P.A.

(57) ABSTRACT

Provided is an embossed product on which a deep bumpy design is formed and which is also excellent in terms of a bumpy design shape-imparting property and cushioning performance and durability thereof. A composite material for embossing is a composite material in which a flexible polyurethane foam sheet is laminated on one surface of a skin material, in which the flexible polyurethane foam sheet has a thickness of 3 to 15 mm and a compression percentage of 5% to 40% in a temperature range of 100° C. to 150° C. In addition, an embossed product is obtained by embossing a surface of the skin material of the composite material for embossing.

7 Claims, 2 Drawing Sheets

(51) Int. Cl.
  *B32B 5/02* (2006.01)
  *B32B 3/30* (2006.01)
(52) U.S. Cl.
  CPC .......... *B32B 5/245* (2013.01); *B32B 2250/03* (2013.01); *B32B 2250/24* (2013.01); *B32B 2262/0276* (2013.01); *B32B 2262/0284* (2013.01); *B32B 2266/0278* (2013.01); *B32B 2307/51* (2013.01); *B32B 2307/72* (2013.01); *B32B 2605/003* (2013.01)
(58) Field of Classification Search
  CPC ....... B32B 2307/722; Y10T 428/24149; Y10T 428/24479; Y10T 428/24496; Y10T 428/24504; Y10T 428/24512; Y10T 428/24521; Y10T 428/24595; Y10T 428/24612; Y10T 428/24942; Y10T 428/2495; Y10T 428/24992
  USPC ....... 428/116, 156, 158, 159, 160, 161, 170, 428/172, 212, 213, 218, 220
  See application file for complete search history.

(56) References Cited

FOREIGN PATENT DOCUMENTS

| | | |
|---|---|---|
| JP | 2007-331222 A | 12/2007 |
| JP | 2014-184580 A | 10/2014 |

\* cited by examiner

COMPOSITE MATERIAL FOR EMBOSSING, AND EMBOSSED PRODUCT

TECHNICAL FIELD

An embodiment of the present invention relates to a composite material for embossing and an embossed product.

BACKGROUND ART

Today, as vehicle interior materials or coverings of chairs, composite materials in which a skin material such as a knitted fabric, a woven fabric, a non-woven fabric, a synthetic leather, or an artificial leather and a flexible polyurethane foam sheet are laminated together are used. In order to improve the designability of the above-described composite materials, there are cases in which a bumpy design is formed on the surface. For example, in order to impart a bumpy design, composite material surfaces are embossed. However, flexible polyurethane foam sheets constituting composite materials are elastic. Therefore, even when composite materials are heated and pressed by means of embossing, in a case in which the design is a fine bumpy shape, there is a problem in that a sufficient shape-imparting effect cannot be obtained due to compression resilience attributed to the elasticity of flexible polyurethane foam sheets.

For example, PTL 1 discloses a method in which, in order to form a deep bumpy pattern, a skin material on which a thick flexible polyurethane foam is laminated is processed using an embossing device having a heat roll. However, this method cannot be said to be enough to satisfy both the depth of the bumpy pattern and the durability of cushioning performance.

CITATION LIST

Patent Literature

[PTL 1] JP-A-2007-276285

SUMMARY OF INVENTION

Technical Problem

An embodiment of the present invention is to solve the above-described problem and to provide an embossed product on which a deep bumpy design is formed and which is also excellent in terms of a bumpy design shape-imparting property and cushioning performance and durability thereof.

Solution to Problem

An embodiment of the present invention is a composite material for embossing in which a flexible polyurethane foam sheet is laminated on one surface of a skin material, in which the flexible polyurethane foam sheet has a thickness of 3 to 15 mm and a compression percentage of 5% to 40% in a temperature range of 100° C. to 150° C.

In addition, the embodiment of the present invention is an embossed product in which embossing is carried out on a skin material surface of the composite material for embossing.

Advantageous Effects of Invention

According to the embodiment of the present invention, it is possible to provide an embossed product on which a deep bumpy design is formed and which is also excellent in terms of a bumpy design shape-imparting property and cushioning performance and durability thereof.

DESCRIPTION OF EMBODIMENTS

Hereinafter, embodiments of the present invention will be described in detail.

An embodiment of the present invention is a composite material for embossing in which a flexible polyurethane foam sheet is laminated on one surface of a skin material, in which the flexible polyurethane foam sheet has a thickness of 3 to 15 mm and a compression percentage of 5% to 40% in a temperature range of 100° C. to 150° C. When embossing is carried out using a composite material for embossing having the above-described constitution, it is possible to obtain embossed products in which a deep bumpy design is formed, the bumpy design shape-imparting property is excellent, and cushioning performance and durability thereof are also excellent.

Here, the one surface of the skin material on which the flexible polyurethane foam sheet is laminated is a rear surface of the skin material. The rear surface of the skin material is a surface on a side opposite to a front surface on which embossing is carried out.

Figure 2:
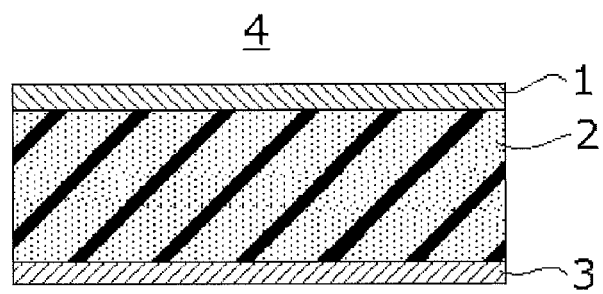
FIG. 2 is a schematic cross-sectional view of a composite material for embossing according to an embodiment.

A cross-sectional view of a composite material for embossing 4 illustrated in FIG. 2 is an example of a lamination state of a skin material 1 and a flexible polyurethane foam sheet 2, and the flexible polyurethane foam sheet 2 is provided on the rear surface of the skin material 1 as a lower layer. In this example, a lining 3 is laminated on the rear surface of the flexible polyurethane foam sheet 2.

The flexible polyurethane foam sheet that is used in the present embodiment is a sheet-like substance of a soft foamed synthetic rubber in which bubbles are communicated, and which is obtained by mixing a polyol and a polyisocyanate as main components together with a foaming agent or the like, resinifying and foaming them. As the flexible polyurethane foam sheet, it is possible to use, for example, a substance or the like obtained by continuously manufacturing a block by means of flexible slab foaming and slicing the block in the longitudinal direction into a long sheet-like shape.

Regarding the characteristics of the flexible polyurethane foam sheet, the compression percentage in a range of 100° C. to 150° C., which is measured and obtained using a compression TMA, is in a range of 5% to 40%. That is, the compression percentage of the flexible polyurethane foam sheet is 5% or more and 40% or less in the entire range of 100° C. to 150° C. During the embossing of the composite material, generally, the temperature of the flexible polyurethane foam sheet is in a range of 100° C. to 150° C. Therefore, when the compression percentage of the flexible polyurethane foam sheet, which is measured by the compression TMA, is 5% or more in a temperature range of 100° C. to 150° C., it is possible to suppress the shape-imparting property of a bumpy design by means of embossing becoming insufficient. When the compression percentage is 40% or less, it is possible to suppress the cushioning performance and durability thereof being impaired by a permanent set generated in the flexible polyurethane foam due to heat during embossing. The compression percentage of the flexible polyurethane foam sheet in a range of 100° C. to 150° C. is preferably in a range of 10% to 30%, that is, preferably 10% or more and 30% or less in the entire range of 100° C. to 150° C.

In the present embodiment, the compression percentage in a range of 100° C. to 150° C. can be obtained as described below. An apparatus for thermomechanical analysis (TMA) is used, a probe for measuring expansion and compression having a flat tip is used, the variation of the thickness of the flexible polyurethane foam sheet at individual temperatures of 100° C. to 150° C. during the heating of a specimen under the application of a constant non-oscillatory load is measured, and a percentage (%) to the thickness (mm) of the flexible polyurethane foam sheet before heating is obtained.

The thickness of the flexible polyurethane foam sheet is 3 to 15 mm and preferably 5 to 10 mm. When the flexible polyurethane foam sheet is 3 mm or more, it is possible to maintain the cushioning performance. In addition, it is possible to form a deep bumpy design. When the flexible polyurethane foam sheet is 15 mm or less, it is possible to suppress process loads becoming significant due to the necessity of an excess amount of heat for the formation of a bumpy design or composite materials to be obtained becoming coarse and hard.

The density (the apparent density of JIS K7222) of the flexible polyurethane foam sheet is preferably 16 to 60 kg/m$^3$ and more preferably 20 to 40 kg/m$^3$. When the density is 16 kg/m$^3$ or more, it is possible to maintain the cushioning performance and durability thereof. When the density is 60 kg/m$^3$ or less, it is possible to maintain the cushioning performance and the shape-imparting property by means of embossing.

The hardness (JIS K6400-2 D method) of the flexible polyurethane foam sheet is preferably 36 to 360 N. When the hardness is 36 N or more, it is possible to maintain the cushioning performance and durability thereof. When the hardness is 360 N or less, it is possible to maintain the cushion feeling and maintain the sitting comfort.

The rebound resilience (JIS K6400-3) of the flexible polyurethane foam sheet is preferably 20% or more and more preferably 30% or more. When the rebound resilience is 20% or more, it is possible to maintain the cushioning performance. The upper limit of the rebound resilience is not particularly limited and may be, for example, 70% or less.

The compression set (JIS K6400-4 A method, 50% compression) of the flexible polyurethane foam sheet is preferably 30% or less, more preferably 15% or less, and still more preferably 10% or less. When the compression set is 30% or less, it is possible to maintain the durability of the cushioning performance. The lower limit of the compression set is not particularly limited and may be, for example, 0% or more.

The repetition compression set (JIS K6400-4 B method, constant displacement method, 50% compression is carried out 80,000 times at normal temperature) of the flexible polyurethane foam sheet is preferably 10% or less, more preferably 6% or less, and still more preferably 5% or less. When the repetition compression set is 10% or less, it is possible to maintain the durability of the cushioning performance. The lower limit of the repetition compression set is not particularly limited and may be, for example, 0% or more.

The skin material that is used in the present embodiment is not particularly limited, and examples thereof include woven fabrics, knitted fabrics, non-woven fabrics, and leathers. A composite body made of two or more kinds of fabrics or leathers may also be used. Examples of the leathers include synthetic leathers, artificial leathers, and natural leathers.

As the skin material, a skin material including a fiber as a constituent element is preferably used. A fiber material constituting the skin material is not particularly limited, but is preferably a thermoplastic fiber from the viewpoint of the shape-imparting property of a bumpy design and the durability. Examples of the thermoplastic fiber include synthetic fibers such as polyesters, polypropylenes, and nylon, semi-synthetic fibers such as acetate and triacetate, and the like. These thermoplastic fibers may be used singly or two or more kinds of thermoplastic fibers may be used in combination. Among these, for the excellency in terms of physical properties, particularly, strength, abrasion resistance, and thermal resistance, synthetic fibers are preferred, polyester fibers are more preferred, and polyethylene terephthalate (PET) fibers are particularly preferred. The fiber material is preferably a fiber material including a thermoplastic fiber as a main constitution, but may be a fiber material in which a thermoplastic fiber and a fiber other than the thermoplastic fiber, for example, a fiber such as a natural fiber or a recycled fiber are combined with each other using a method such as mix spinning, fiber combination, intertwisting, interweaving, or interknitting as long as the properties are not affected.

The single fiber fineness of the fiber constituting the skin material is preferably a fiber of mainly 1.5 dtex or less. When the single fiber fineness is 1.5 dtex or less, the shape-imparting property of a fine bumpy shape by means of embossing further improves. In addition, the single fiber fineness is preferably 0.03 dtex or more in terms of the abrasion resistance.

The form of a yarn may be any of a yarn of a short fiber called a spun yarn or a yarn of a long fiber called a multifilament yarn or a monofilament yarn and, furthermore, may be a spun yarn of long and short composite obtaining by combining a long fiber and a short fiber. The multifilament yarn may be twisted as necessary or may be subjected to processing such as temporary twisting or a liquid disturbing treatment.

Such a skin material is subjected to a pretreatment such as presetting or scouring or a color addition step as necessary and is then used for the composite material for embossing of the present embodiment.

The thickness of the skin material is preferably in a range of 0.5 to 3.0 mm from the viewpoint of the shape-imparting property of a bumpy design, abrasion resistance, or the like.

A method for laminating and integrating the skin material and the flexible polyurethane foam sheet is not particularly limited, and examples thereof include a method in which an adhesive is used, a method by flame lamination, and the like. Among these, the method by flame lamination is preferred from the viewpoint of process loading or weight reduction.

On a surface of the flexible polyurethane foam sheet opposite to the skin material side, a lining may be further laminated from the viewpoint of the contamination prevention of an embossing roll during embossing or a capability of smoothly sliding the composite material during sewing operation and the viewpoint of the breakage prevention of the urethane foam. Examples of the lining include fabric cloth made of a synthetic fiber such as polyester.

Examples of a method for laminating and integrating the lining include the same methods as the method for laminating and integrating the skin material and the flexible polyurethane foam sheet. Among them, the method by flame lamination is preferred from the viewpoint of process loading or weight reduction.

In the above-described manner, the composite material for embossing of the present embodiment is obtained.

Figure 3:
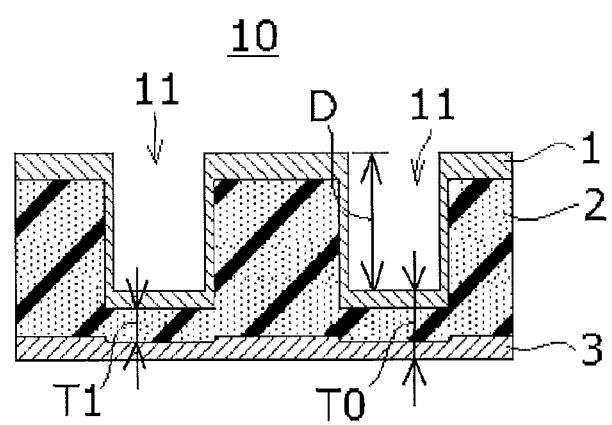
FIG. 3 is a schematic cross-sectional view of an embossed product according to an embodiment.

On the obtained composite material, embossing is carried out. That is, a heated embossing mold (for example, an embossing roll or a flat plate embossing mold) is pressed onto a skin material surface of the composite material, thereby forming a bumpy design. Therefore, an embossed product which is a bumpy design-formed composite material is obtained. FIG. 3 is a view schematically illustrating a cross section of an obtained embossed product 10, and recess portions 11 are formed on the surface by embossing.

Examples of the bumpy design include, typically, a grain shape, but the bumpy design is not limited thereto and may be, for example, a fabric cloth shape such as a woven fabric feeling or a denim feeling, geometric shapes such as random points, lines, circular shapes, triangular shapes, rectangular shapes, or shapes obtained by combining two or more kinds of the above-described shapes.

The surface temperature (that is, corresponding to the thermal treatment temperature during heating and pressing) of the embossing mold such as an embossing roll or a flat plate embossing mold may be appropriately set depending on the material of the skin material or the flexible polyurethane foam sheet. For example, in a case in which the material of the skin material is polyethylene terephthalate (melting point: 260° C.), the surface temperature is preferably 100° C. to 210° C. and more preferably 120° C. to 180° C. When the temperature is 100° C. or higher, it is possible to maintain the durability of the formed bumpy design, particularly, the thermal resistance. When the temperature is 210° C. or lower, it is possible to suppress the gloss of the skin material surface becoming strong or the texture of the embossed product becoming coarse and hard.

The time for pressing the heated embossing roll to the skin material varies depending on the shape of the bumpy design, but the pressing time is preferably 0.01 to 5 seconds and more preferably 0.1 to 2 seconds. In addition, in the case of an embossing device including a flat plate embossing mold, the pressing time is preferably 30 to 120 seconds and more preferably 50 to 90 seconds. When the pressing time is equal to or longer than the lower limit value, it is possible to form a clear bumpy design, and it is possible to maintain the durability of the bumpy design. When the pressing time is equal to or shorter than the upper limit value, it is possible to suppress the texture becoming coarse and hard or tarnishing or the productivity becoming poor.

The treatment rate in the case of using the embossing device including an embossing roll is generally 0.1 to 10 m/minute and preferably 0.3 to 5 m/minute. The treatment rate in the case of using the embossing device including a flat plate embossing mold is generally 0.5 to 6 m/minute and preferably 0.6 to 3 m/minute.

The pressure during the pressing is preferably 1 to 10 MPa and more preferably 2 to 5 MPa. When the pressure is 1 MPa or higher, it is possible to form a clear bumpy design. When the pressure is 10 MPa or lower, it is possible to prevent the texture from becoming coarse and hard.

In the above-described manner, a bumpy design is formed on the surface of the skin material. In the bumpy design, particularly, the recess portions that are formed by projection portions of the embossing mold being pressed thereto as described above, the thicknesses of the respective layers (that is, the skin material, the flexible polyurethane foam sheet, and the lining) change before and after the embossing. A thickness T0 (refer to FIG. 3) of the composite material in the recess portion 11 after the embossing is preferably 0.5 to 2.0 mm and more preferably 0.7 to 1.5 mm. When the thickness T0 is 0.5 mm or more, the gloss of the recess portions generated by the flattening of the surface due to heat during the embossing is suppressed, and it is possible to suppress the designability being impaired. When the thickness T0 is 2.0 mm or less, the bumpy design becomes clear, and it is possible to maintain the durability or rub resistance of the bumpy design.

A thickness T1 (refer to FIG. 3) of the flexible polyurethane foam sheet 2 in the recess portion 11 after the embossing is preferably 1.0 mm or less and more preferably 0.6 mm or less. When the thickness T1 is 1.0 mm or less, it is possible to make the bumpy design clear.

A depth D (refer to FIG. 3) of the recess portion 11 formed by the embossing is preferably 3.0 mm or more, and it is possible to make the bumpy design clear. The upper limit of the depth D of the recess portion is not particularly limited and may be, for example, 15 mm or less.

In addition, when the composite material before the formation of the bumpy design (before the embossing) is preliminarily heated using near-infrared rays, the pressing time can be shortened, which is preferable in terms of the processing efficiency.

In the above-described manner, an embossed product of the present embodiment can be obtained.

EXAMPLES

Hereinafter, the present invention will be more specifically described using examples, but the present invention is not limited thereto. In addition, the evaluation of the compression percentage of a flexible polyurethane foam sheet in a range of 100° C. to 150° C. and a composite material on which a bumpy design was formed was carried out according to the following methods.

(1) Compression Percentage of Flexible Polyurethane Foam Sheet in Range of 100° C. to 150° C.

An apparatus for thermomechanical analysis (TMA) (manufactured by Hitachi High-Tech Science Corporation, EXSTAR TMA-SS6100/DSC6200) was used, a probe for measuring expansion having a flat tip was used as an indenter, the variation of the thickness of the flexible polyurethane foam sheet at individual temperatures during the application of a constant load and heating was measured, and a percentage (%) to the thickness (mm) of the flexible polyurethane foam sheet before heating was obtained. The measurement conditions were a load of 100 mN (10.2 gf), a temperature-rise rate of 10° C./minute, and a diameter of the probe of 5 mm.

Figure 1:
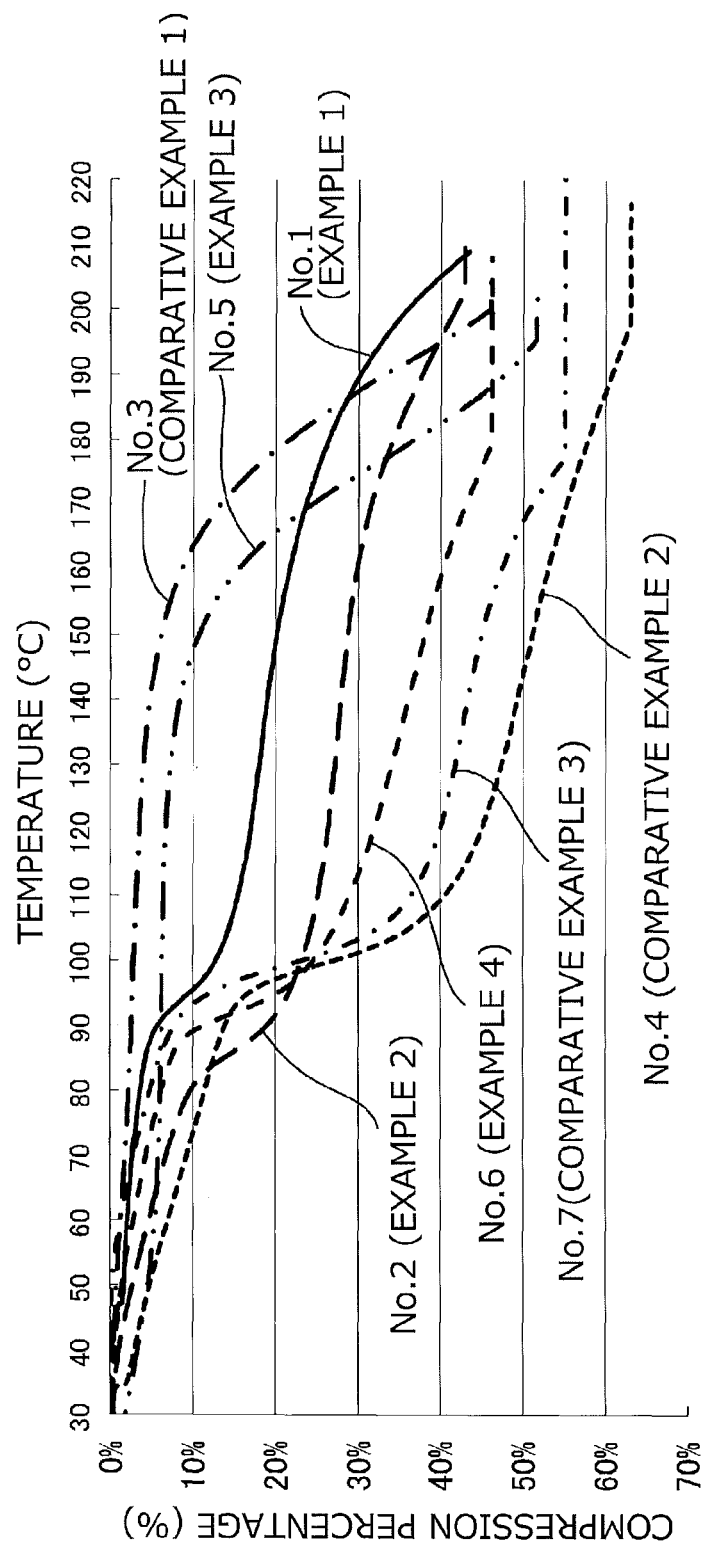
FIG. 1 is a graph illustrating a compression percentage of a flexible urethane foam sheet in an example.

A graph of the obtained compression percentages and temperatures is illustrated in FIG. 1. The upper end of the vertical axis of the graph indicates a compression percentage of 0%, and the graph extends downwards as the variation of the thickness of the flexible polyurethane foam sheet increases, and the compression percentage increases. In addition, among the compression percentages in a range of 100° C. to 150° C., the minimum value and the maximum value are shown in Table 1.

(2) Bumpy Design Shape-Imparting Property

A bumpy design-formed composite material on which embossing had been carried out was evaluated using the following evaluation standards.

(Evaluation Standards)

A: The depth of the recess portion was 3.0 mm or more, and the bumpy design was clearly formed.

B: The depth of the recess portion was more than 2.0 mm and less than 3.0 mm, and the bumpy design was slightly unclearly formed.

C: The depth of the recess portion was 2.0 mm or less, and the bumpy design was unclear.

(3) Cushioning Performance

Regarding the evaluation of the cushioning performance after embossing, the compression characteristics were measured using a handy compression tester KES-G5 manufactured by KATO Tech Co., Ltd., and the cushioning performance was determined using the value of the compression resilience RC (%) and the compression work amount WC (gf·cm/cm$^2$, that is, 0.98 N/m) which were obtained from the measurement result, on the basis of the following standards. Meanwhile, regarding the measurement conditions, the maximum load was set to 500 gf/cm$^2$, the compression area was set to 2 cm$^2$, and the compression speed was set to 0.1 cm/second. As the value of the compression resilience increases, the recovery property after compression becomes more favorable, and, as the compression work amount increases, the composite material becomes softer.

(Evaluation Standards)

A: The compression resilience was 30% or more, and the value of the compression work amount was 100 or more.

B: The compression resilience was 25% or more, the value of the compression work amount was 70 or more, and the evaluation standard A was not satisfied.

C: The compression resilience was less than 25%, or the value of the compression work amount was less than 70.

(4) Bumpy Design Durability

For bumpy design-formed composite materials of individual examples and individual comparative examples which were used in a durability test, the embossing conditions were corrected and composite materials on which a clear bumpy design was formed were employed. Automotive seats were produced using the respective bumpy design-formed composite materials for coverings, and 8,000 times of the durability test (under an environment of 23° C. and 50% RH) was carried out using a seat getting on-and-off durability tester manufactured by TM Tech Co., Ltd. The test specimen after the durability test was observed and evaluated according to the following standards.

(Evaluation Standards)

A: The bumpy shape clearly remained.

B: There were places in which the bumpy shape was slightly unclear.

C: The bumpy shape was slightly unclear as a whole.

D: The bumpy shape was unclear.

(5) Durability of Cushioning Performance

The bumpy design-formed composite material after the bumpy design durability test was evaluated on the basis of the following evaluation standards.

(Evaluation Standards)

A: The cushioning performance of the flexible urethane foam was almost the same as that before the durability test.

B: The cushioning performance of the flexible urethane foam was slightly inferior to that before the durability test.

C: The cushioning performance of the flexible urethane foam was inferior to that before the durability test.

Example 1

A woven fabric A (warp: a PET multifilament yarn of 180 dtex/156 f, weft: a PET multifilament textured yarn of 167 dtex/48 f, mass: 300 g/m$^2$, thickness: 0.9 mm, sateen woven fabric) as a skin material and a knitted fabric B (polyester half tricot woven fabric, thickness: 0.3 mm) as a lining were integrated into a 10 mm-thick flexible polyurethane foam sheet 1 by means of flame lamination, and thereby a composite material which was a three-layer structure was prepared. The property values of the flexible polyurethane foam sheet used are shown in Table 1.

TABLE 1

| Urethane foam sheet No. | 1 | 2 | 3 | 4 | 5 | 6 | 7 |
| --- | --- | --- | --- | --- | --- | --- | --- |
| Density (JIS K7222) kg/m$^3$ | 28.8 | 23.0 | 19.2 | 32.4 | 26.0 | 23.0 | 33.0 |
| Hardness (JIS K6400-2 D method) N | 107.8 | 83.8 | 63.7 | 100.9 | 117.0 | 92.0 | 186.0 |
| Rebound Resilience (JIS K6400-3) % | 31 | 36 | 33 | 15 | 33 | 36 | 36 |
| Compression set (JIS K6400-4 A method) % | 12.5 | 10.0 | 4.3 | 23.4 | 5.5 | 10.0 | 31.0 |
| Repetition compression set (JIS K6400-4 B method) % | 5.5 | 4.7 | 3.7 | 2.4 | 3.9 | 4.6 | 7.7 |
| Compression percentage minimum value at 100° C. to 150° C. % | 13 | 23 | 3 | 30 | 6 | 25 | 24 |
| Compression percentage maximum value at 100° C. to 150° C. % | 20 | 28 | 6 | 52 | 11 | 38 | 45 |

Next, in an embossing machine in which an outer diameter of an embossing roll was 250 mm and an outer diameter of a backup roll was 350 mm, the embossing roll surface temperature was set to 180° C., the surface temperature of the backup roll was set to 230° C., the roll pressure was set to 2 MPa, and the embossing rate was set to 2 m/minute. The bumpy design of the embossing roll was a horizontal stripe pattern in which 1 mm-wide linear lines were alternately repeated at intervals of 25 mm and 5 mm, and the depth of grooves was 12 mm. The skin material surface of the composite material was installed on the embossing roll side, and embossing was carried out. The respective layer thicknesses in a recess portion after embossing, the recess portion depth, and the evaluation results are shown in Tables 2 and 3.

Examples 2 to 4

Composite materials laminated and integrated by means of flame lamination were prepared in the same manner as in Example 1 except for the fact that the flexible polyurethane foam sheet 1 was changed to a flexible polyurethane foam sheet 2, 5, or 6 in Table 1, and then embossing was carried out.

Examples 5 to 7

Composite materials laminated and integrated by means of flame lamination were prepared in the same manner as in Example 1 except for the fact that the thickness of the flexible polyurethane foam sheet 1 was changed to a thickness in Table 3, and then embossing was carried out.

The respective layer thicknesses in a recess portion after embossing, the recess portion depth, and the evaluation results in Examples 2 to 7 are shown in Tables 2 and 3.

Comparative Examples 1 to 3

Lamination and integration were carried out by means of flame lamination in the same manner as in Example 1 except for the fact that the flexible polyurethane foam sheet 1 was changed to a flexible polyurethane foam sheet 3, 4, or 7, and embossing was carried out.

Comparative Examples 4 and 5

Composite materials laminated and integrated by means of flame lamination were prepared in the same manner as in Example 1 except for the fact that the thickness of the flexible polyurethane foam sheet 1 was changed to a thickness in Table 3, and then embossing was carried out.

The respective layer thicknesses in a recess portion after embossing, the recess portion depth, and the evaluation results in Comparative Examples 1 to 5 are shown in Tables 2 and 3.

On the products obtained in the Examples, deep bumpiness were formed, and all of the bumpy design shape-imparting property, the cushioning performance and durability thereof, and the bumpy design durability were evaluated as excellent. Meanwhile, in the product obtained in Example 3, the compression percentage minimum value at 100° C. to 150° C. was relatively low, and thus the bumpy design shape-imparting property was slightly poorer than that in Example 1, but was superior to those in the Comparative Examples. In addition, in the product obtained in Example 4, the compression percentage maximum value at 100° C. to 150° C. was relatively high, and thus the cushioning performance and durability thereof and the bumpy design durability were slightly poorer than those in Example 1, but were superior to those in Comparative Examples 2 and 3.

On the other hand, in the product obtained in Comparative Example 1, the bumpiness were shallow, and the bumpy design shape-imparting property was evaluated as poor. In the products obtained in Comparative Examples 2 and 3, all of the bumpy design shape-imparting property, the cushioning performance, and the bumpy design durability were evaluated as poor.

As shown in Table 3, when the thickness of the flexible polyurethane foam sheet was in a range of 3 to 15 mm, the bumpy design shape-imparting property, the cushioning performance and durability thereof, and the bumpy design durability were evaluated as excellent. Meanwhile, in Example 5, the recess portion depth was the same as that in Comparative Example 2, but deep recess portions were formed in relation to the thickness before the process. On the other hand, in Comparative Example 4, the thickness of the flexible polyurethane foam sheet was too thin, and thus the cushioning performance was poor, and, in Comparative Example 5, the thickness of the flexible polyurethane foam sheet was too thick, and thus the bumpy design shape-imparting property was significantly impaired.

TABLE 2

| | | Example 1 | Example 2 | Comparative Example 1 | Comparative Example 2 | Example 3 | Example 4 | Comparative Example 3 |
|---|---|---|---|---|---|---|---|---|
| Constitution | First layer: skin material | Woven fabric A | Woven fabric A | Woven fabric A | Woven fabric A | Woven fabric A | Woven fabric A | Woven fabric A |
| | Thickness (mm) | 0.9 | 0.9 | 0.9 | 0.9 | 0.9 | 0.9 | 0.9 |
| | Second layer: flexible polyurethane foam sheet No. | 1 | 2 | 3 | 4 | 5 | 6 | 7 |
| | Thickness (mm) | 10 | 10 | 10 | 10 | 10 | 10 | 10 |
| | Third layer: lining | Knitted fabric B | Knitted fabric B | Knitted fabric B | Knitted fabric B | Knitted fabric B | Knitted fabric B | Knitted fabric B |
| | Thickness (mm) | 0.3 | 0.3 | 0.3 | 0.3 | 0.3 | 0.3 | 0.3 |
| After processing | Recess portion thickness after embossing — First layer (mm) | 0.5 | 0.5 | 0.5 | 0.5 | 0.5 | 0.5 | 0.5 |
| | Second layer (mm) | 0.5 | 0.4 | 6.0 | 0.4 | 0.5 | 0.4 | 0.3 |
| | Third layer (mm) | 0.2 | 0.2 | 0.2 | 0.2 | 0.2 | 0.2 | 0.2 |
| | Recess portion depth (mm) | 3.7 | 3.4 | 1.2 | 2.3 | 2.8 | 3.3 | 2.4 |
| Evaluation | Bumpy design shape-imparting property | A | A | C | B | B | A | B |
| | Compression resilience RC (%) | 38.8 | 35.1 | 43.1 | 27.7 | 40.6 | 26.6 | 24.1 |
| | Compression work amount WC (gf·cm/cm$^2$) | 130.9 | 110.3 | 180.5 | 68.5 | 155.6 | 90.3 | 75.1 |
| | Cushioning performance | A | A | A | C | A | B | C |
| | Bumpy design durability | A | B | A | D | A | B | C |
| | Cushioning performance durability | A | A | A | B | A | B | B |

TABLE 3

| | | Example 5 | Example 6 | Example 7 | Comparative Example 4 | Comparative Example 5 |
|---|---|---|---|---|---|---|
| Constitution | First layer: skin material | Woven fabric A | Woven fabric A | Woven fabric A | Woven fabric A | Woven fabric A |
| | Thickness (mm) | 0.9 | 0.9 | 0.9 | 0.9 | 0.9 |
| | Second layer: flexible polyurethane foam sheet No. | 1 | 1 | 1 | 1 | 1 |
| | Thickness (mm) | 3 | 5 | 15 | 2 | 20 |
| | Third layer: lining | Knitted fabric B | Knitted fabric B | Knitted fabric B | Knitted fabric B | Knitted fabric B |
| | Thickness (mm) | 0.3 | 0.3 | 0.3 | 0.3 | 0.3 |

TABLE 3-continued

| | | | Example 5 | Example 6 | Example 7 | Comparative Example 4 | Comparative Example 5 |
|---|---|---|---|---|---|---|---|
| After processing | Recess portion thickness after embossing | First layer (mm) | 0.5 | 0.5 | 0.5 | 0.5 | 0.5 |
| | | Second layer (mm) | 0.2 | 0.3 | 1.0 | 0.2 | 8.5 |
| | | Third layer (mm) | 0.2 | 0.2 | 0.2 | 0.2 | 0.2 |
| | Recess portion depth (mm) | | 2.3 | 3.3 | 3.5 | 1.5 | 1.1 |
| Evaluation | Bumpy design shape-imparting property | | B | A | A | C | C |
| | Compression resilience RC (%) | | 39.1 | 37.7 | 33.5 | 40.5 | 32.9 |
| | Compression work amount WC (gf · cm/cm$^2$) | | 88.8 | 110.4 | 176.3 | 67.1 | 190.1 |
| | Cushioning performance | | B | A | A | C | A |
| | Bumpy design durability | | A | A | B | B | C |
| | Cushioning performance durability | | B | A | A | B | A |

INDUSTRIAL APPLICABILITY

The embossed product according to the embodiment of the present invention can be used as, for example, an interior material for a variety of vehicles such as automobiles or railroad vehicles and as a surface material for chairs in vehicles, interiors, and the like.

Hitherto, several embodiments have been described, but these embodiments have been proposed as examples and are not intended to limit the scope of the invention. These novel embodiments can be carried out in a variety of other forms and can be omitted, substituted, or modified in various manners within the scope of the gist of the invention.

REFERENCE SIGNS LIST

1 SKIN MATERIAL
2 FLEXIBLE POLYURETHANE FOAM SHEET
3 LINING
4 COMPOSITE MATERIAL FOR EMBOSSING
10 EMBOSSED PRODUCT
11 RECESS PORTION

The invention claimed is:

1. An embossed laminate comprising:
a skin material which is comprised of fibers or synthetic or artificial or natural leather, and a flexible polyurethane foam sheet laminated at a front surface thereof on a rear surface of the skin material, the skin material having an embossed bumpy design on a front surface of the skin material,
wherein compression resilience of the embossed laminate at a maximum load of 500 gf/cm$^2$ is 25% to 40.6% and compression work amount of the embossed laminate is 70 gf·cm/cm$^2$ to 176.3 gf·cm/cm$^2$,
wherein fibers of the skin material are only on a front surface of the flexible polyurethane foam sheet, and
wherein the flexible polyurethane foam sheet has a thickness of 3 to 15 mm and a compression percentage of 5% to 40% in an entire temperature range of 100° C. to 150° C. as determined by compression thermomechanical analysis.

2. The embossed laminate according to claim 1,
wherein a thickness of the flexible polyurethane foam sheet in a recess portion of the embossed bumpy design is 1.0 mm or less, and
a depth of the recess portion is 3.0 mm or more.

3. The embossed laminate according to claim 1,
wherein a compression set of the flexible polyurethane foam sheet, before the laminating and the embossing, is 30% or less.

4. The embossed laminate according to claim 1,
wherein a repetition compression set of the flexible polyurethane foam sheet, before the laminating and the embossing is 10% or less.

5. The embossed laminate according to claim 1,
wherein a density of the flexible polyurethane foam sheet, before the laminating and the embossing, is 16 to 60 kg/m$^3$.

6. The embossed laminate according to claim 1,
wherein a rebound resilience of the flexible polyurethane foam sheet, before the laminating and the embossing, is 20% or more.

7. The embossed laminate according to claim 1,
wherein the compression percentage of the flexible polyurethane foam sheet, before the laminating and the embossing, in a temperature range of 100° C. to 150° C. is 10% to 30% as determined by compression thermomechanical analysis.

* * * * *